United States Patent
Harlowe, Jr. et al.

(10) Patent No.: US 6,706,344 B1
(45) Date of Patent: Mar. 16, 2004

(54) CONTROLLED FUMIGATION OF WOODEN STRUCTURES

(75) Inventors: William W. Harlowe, Jr., Granite Shoals, TX (US); William A. McMahon, San Antonio, TX (US); Donald J. Mangold, San Antonio, TX (US); Bruce Bernstein, Rockville, MD (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 0 days.

(21) Appl. No.: 08/884,960

(22) Filed: Jun. 30, 1997

Related U.S. Application Data

(63) Continuation-in-part of application No. 08/365,779, filed on Dec. 29, 1994, now abandoned.

(51) Int. Cl.⁷ .............................................. A01M 13/00
(52) U.S. Cl. .................... 428/35.7; 43/125; 43/126; 47/57.5; 47/58; 47/58.5; 424/43; 424/45; 424/78.01; 424/78.17; 424/78.31; 424/DIG. 8; 424/DIG. 11
(58) Field of Search ................. 424/405, 408, 424/412, DIG. 11, 43, 45, 78.01, 78.31, 78.17, DIG. 8; 428/537.1, 421, 422, 35.7, 36.6; 47/57.5, 58.5, 58; 43/125, 126

(56) References Cited

U.S. PATENT DOCUMENTS

| | | | | |
|---|---|---|---|---|
| 1,999,458 A | | 4/1935 | Hollister | 47/57.5 |
| 2,923,039 A | | 2/1960 | Imus | 43/131 |
| 3,264,089 A | * | 8/1966 | Hansen | 71/64 |
| 3,640,234 A | * | 2/1972 | Carroll et al. | 111/16 |
| 3,745,057 A | | 7/1973 | Loft et al. | 428/44 |
| 4,207,705 A | | 6/1980 | Errede et al. | 47/48.5 |
| 4,344,250 A | * | 8/1982 | Fahlstrom | 47/57.5 |

(List continued on next page.)

FOREIGN PATENT DOCUMENTS

| | | | | |
|---|---|---|---|---|
| AU | 221947 | * | 7/1958 | 43/131 |
| EP | 131759 | * | 1/1985 | 43/131 |
| GB | 848122 | * | 9/1960 | 424/40 |
| JP | 4070972 | * | 6/1979 | 43/131 |
| JP | 7050901 | * | 3/1982 | 424/40 |
| WO | WO 97/26868 | * | 7/1997 | A61K/9/32 |

OTHER PUBLICATIONS

Hackh's Chemical Dictionary, 3$^{rd}$ ed. (1944), p. 360. [Definition of "fumigant"].*

M. Bahadir et al, Pestic. Sci. Biotechnol., Proc. Int. Congr. Pestic. Chem, 1986 mtg.,pp. 265–272, 1987.*

P. A. Cooper, Bi–Mon. Res. Notes, Can. For. Serv. 30(6) p. 37, 1974.*

B.S. Goodell, Wood Fiber Sci., 21 (1), pp. 37–44, 1989.*

*Primary Examiner*—Sandra M. Nolan
(74) *Attorney, Agent, or Firm*—Peters, Verny, Jones & Schmitt, L.L.P.; Howard M. Peters

(57) ABSTRACT

The present invention provides an apparatus and method for controlled release of a fumigant into a wooden structure to prevent decay of that structure. According to the present invention, a fumigant in an ampule or container is inserted into the wooden structure. The ampule or container is made of a polymeric material that does not react with the fumigant, but having walls which are permeable to the fumigant such that, when inserted into the wooden structure, the rate of release of the fumigant through the walls of the ampule is slow enough to continuously treat and arrest decay of the wooden structure, particularly decay caused by fungi, over extended periods of time (i.e., 1, 5, 7, 10, 15, 20 or 30 years). The rate of release of the fumigant can be controlled by the type of fumigant, the shape of the container, the specific polymer used to make the container, and by the thickness of the container wall.

33 Claims, 2 Drawing Sheets

U.S. PATENT DOCUMENTS

| | | | |
|---|---|---|---|
| 4,389,446 A | * 6/1983 | Blom et al. | 428/541 |
| 4,400,909 A | * 8/1983 | Reese | 47/2 |
| 4,445,641 A | 5/1984 | Baker et al. | 239/6 |
| 4,552,752 A | 11/1985 | Amick | 424/419 |
| 4,554,155 A | 11/1985 | Allan et al. | 424/419 |
| 4,597,218 A | 7/1986 | Friemel et al. | 43/131 |
| 4,666,767 A | * 5/1987 | Von Kohorn et al. | 428/304.4 |
| 4,793,474 A | 12/1988 | Drake | 206/0.5 |
| 4,819,374 A | * 4/1989 | Gemgnani | 47/58 |
| 4,932,155 A | 6/1990 | Friemel et al. | 43/125 |
| 5,244,615 A | * 9/1993 | Hobbs | 264/83 |
| 5,679,129 A | * 10/1997 | Hon | 71/64.11 |
| 6,060,076 A | * 5/2000 | Voris et al. | 424/411 |

* cited by examiner

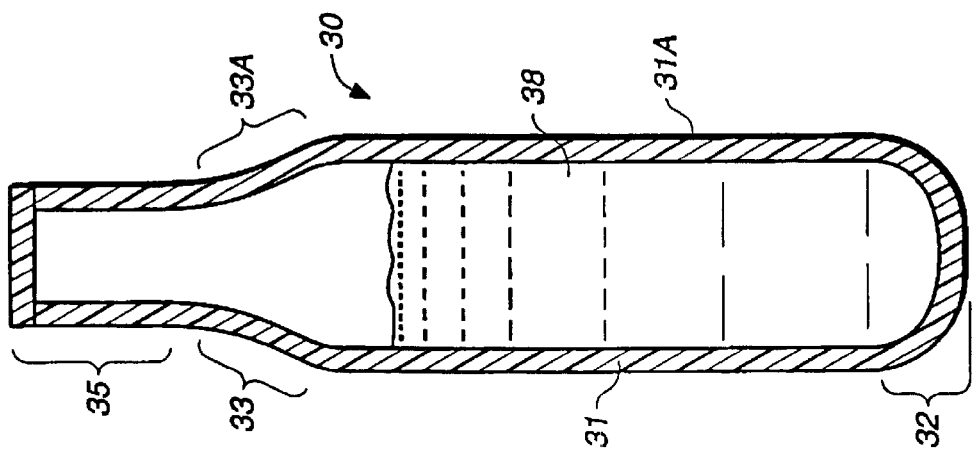
FIG._3
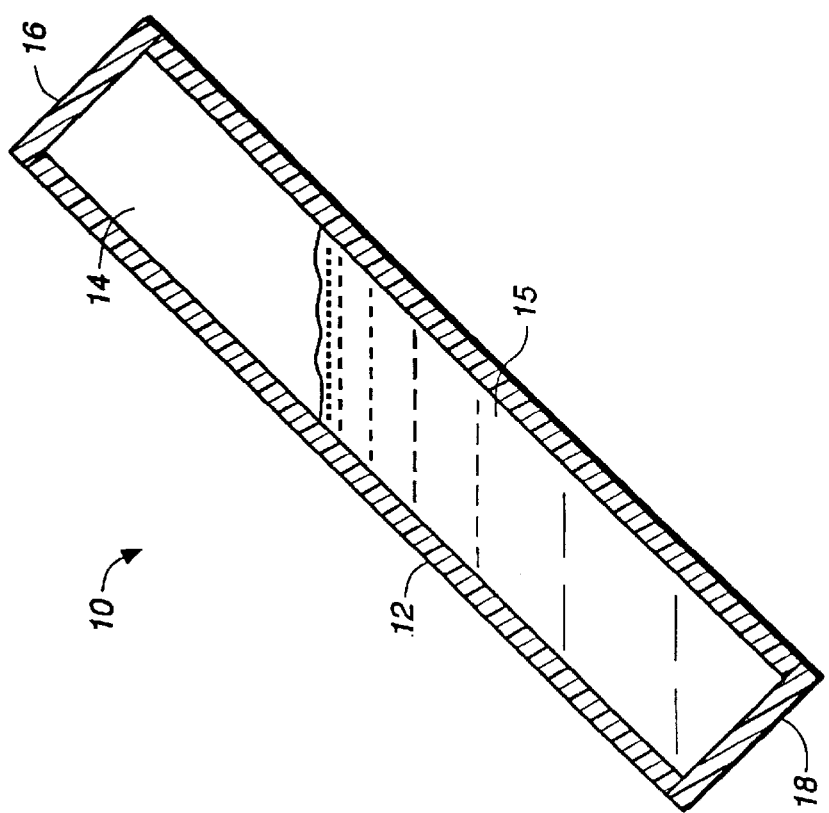
FIG._1

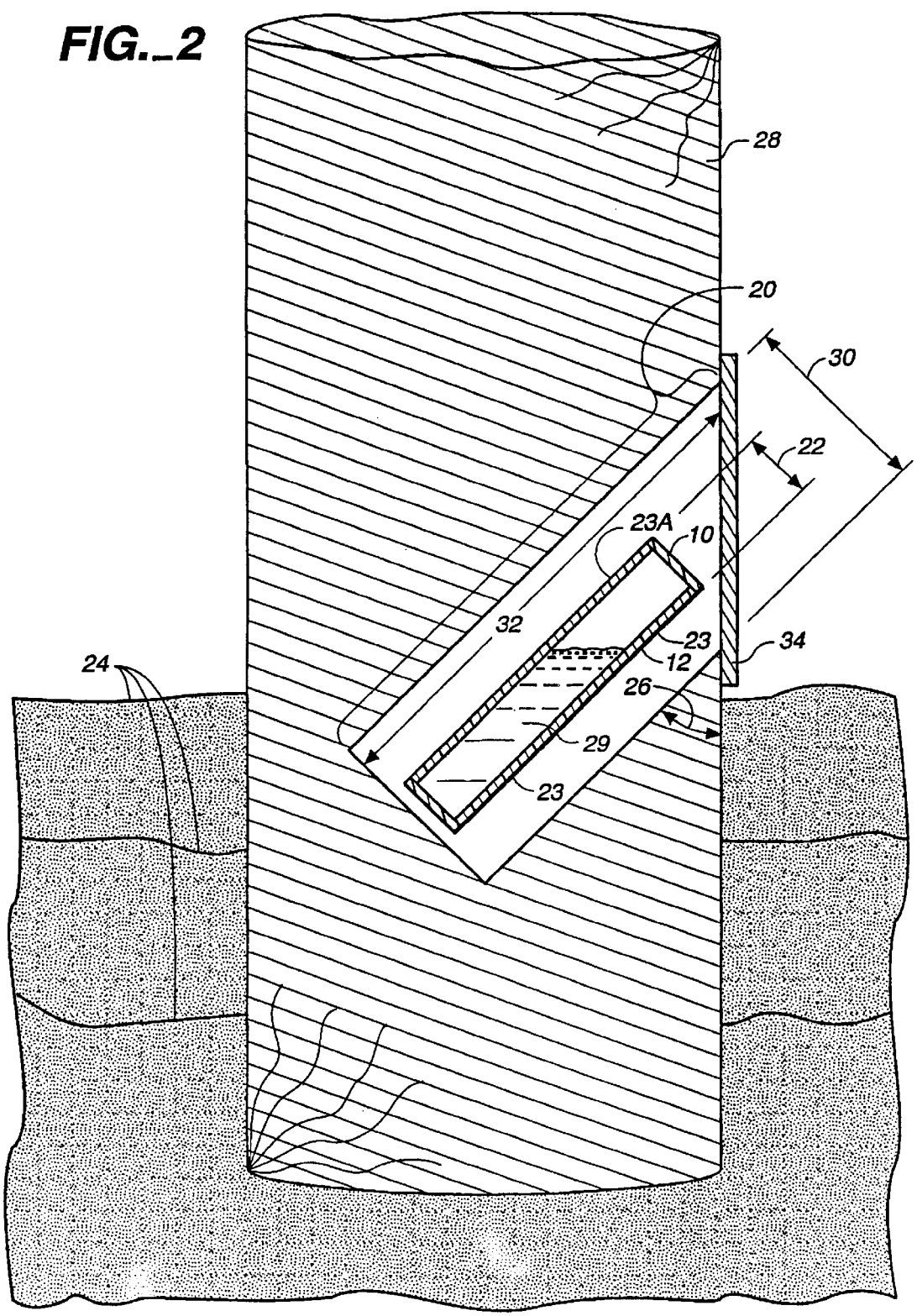
FIG._2

CONTROLLED FUMIGATION OF WOODEN STRUCTURES

RELATED APPLICATION

This application is a continuation-in-part of U.S. Ser. No. 08/365,779, filed Dec. 29, 1994, now abandoned, which is incorporated herein by reference in its entirety.

BACKGROUND OF THE INVENTION

1. Field of the Invention

The present invention relates to an improved apparatus and method for treating wood structures to arrest decay over extended periods of time. More particularly, the present invention relates to a method for packaging, dispensing, and safely introducing wood-protecting chemicals into the internal structure of wood.

2. Background of the Invention

Wood structures, particularly outdoor structures and supports, such as utility poles, piling supports, marine piles, and building components are subject to attack by wood-destroying fungi and insects. Often, such destruction can be ongoing and extensive internally before it is noticed externally.

One way to combat such destruction is to apply chemical (s) to the wood, preferably internally, which are toxic to these wood-destroying fungi and insects. Unfortunately, chemicals that are toxic to wood-destroying agents also are sometimes toxic to man, animals, plants, other insects, and to the environment, generally. Therefore, the release of such toxic agents into the wood structure must be carefully controlled and contained. Also, persons who are required to handle such chemicals may be in danger if they are not adequately protected during handling.

Effective protection of a wood structure will result only if the wood is treated over a long period of time; however, once a treatment is applied, it is nearly impossible to provide prolonged supervision of the treated structure. Therefore, the treatment should be inconspicuous so that children or animals do not tamper with the treatment, exposing themselves and others to potentially toxic chemicals.

Until recently, wood was treated with toxic chemicals by inserting enclosed packages of such chemicals into a preformed cavity in the wood. The chemicals were released by mechanical means, e.g., external mechanical pressure or for example, when the package contacted a puncturing device at the far end of the cavity. Another means for mechanically releasing such chemicals was to provide the chemicals in a cartridge which could be knocked into the wood using sufficient force to overpressure the cartridge and cause the chemicals to be injected into the wood. The shattering technique added the risk that shattered pieces of the cartridge might harm the person who was applying the cartridge, or otherwise harm the surrounding environment and its inhabitants.

One method used to minimize the foregoing risks was to use a container which permits a time-delayed release of the chemicals. Typically, time-delayed release involves the use of a container with at least a portion that will dissolve after a period of time. For example, a container may have a plug that is impermeable to the chemicals in the container, but chemically reactive so that the plug dissolves after a period of time. Alternately, the chemicals can be in a permeable package inside of an impermeable but chemically reactive outer container which dissolves after a period of time.

Time-delayed application of wood-treatment chemicals is safer than previous methods. Unfortunately, time-delayed application typically has a relatively short duration because, once the chemically reactive portion of the fumigant container dissolves, the release of the chemicals is substantially uncontrolled. As a result, the chemicals tend to dissipate more rapidly than desired.

U.S. patents of interest include, for example, Fahlstrom, U.S. Pat. No. 4,344,250; Hobbs, U.S. Pat. No. 5,244,615; Blom, et al., U.S. Pat. No. 4,389,446; Hollister, U.S. Pat. No. 1,999,458; Imus, U.S. Pat. No. 2,923,039; Loft, et al., U.S. Pat. No. 3,745,057; Errede, et al., U.S. Pat. No. 4,207,705; Baker, et al., U.S. Pat. No. 4,445,641; Amick, U.S. Pat. No. 4,552,752; Allan, et al., U.S. Pat. No. 4,554,155; Frimel, et al., U.S. Pat. No. 4,597,218; Drake, U.S. Pat. No. 4,793,474; and Frimel, et al., U.S. Pat. No. 4,932,155.

Other patents of interest include, House, Japan 4070972, filed Jun. 7, 1979; Shemelsu, Japan 7050901, filed Mar. 25, 1982; Heinen, Great Britain 848,122, filed Sep. 14, 1960; Freyberg, European Patent 131,759, filed Jan. 23, 1985; and Ghys, Australia 221,947, filed Jul. 27, 1958.

All references, articles, patents, patent applications, standards, and the like cited herein are incorporated by reference in their entirety.

A safe method to prevent wood decay using the long-term controlled release of wood-treating chemicals would be highly desirable. The present invention provides such a method.

SUMMARY OF THE INVENTION

The present invention provides an apparatus and method for controlled release of a fumigant into a wood structure to prevent decay of that structure. According to the present invention, a fumigant in a sealed polymer ampule or container is inserted into the wooden structure. The ampule or container is made of a polymeric organic material that does not react with the fumigant, but is permeable to the fumigant such that, when inserted into the wooden structure, the rate of release of the fumigant through the ampule wall is slow enough to continuously treat and arrest decay of the wooden structure, particularly decay caused by fungi, over extended periods of time (i.e., 1 to 30 years). The rate of release of a fumigant or mixture of fumigants can be controlled by the shape of the container, the nature of the polymer used to make the container, and by the thickness of the container wall.

In another aspect, the present invention relates to a wooden structure protected from decay for a prolonged period of time, comprising:

a wooden structure; and a fumigant in at least one sealed container inserted into said wooden structure, which container has walls comprising a fiber-free heat sealable organic polymer ampule, which is a multiple layer or single layer tube sealed or closed at one or both ends that is permeable to but otherwise inert to said fumigant, the walls allowing the fumigant to be retained while permitting controlled release of a sufficient amount of the fumigant to diffuse at a rate of fumigant loss of between about 1 and 15 mg/day through said walls to protect said wooden structure from decay for a period of time of up to at least 7 years or for up to about 30 years, with the proviso that no external force other than ambient pressure and temperature is present to release the fumigant from said sealed container. Preferably, the polymer comprises a chemically modified or non-modified thermoplastic polymer.

Preferably, in the protection of the wood structure the polymer is selected from the group consisting of a high density polyethylene polymer, a polypropylene polymer, a crosslinked polyethylene, a crosslinked polypropylene, a surface fluorinated high-density polyethylene polymer, a fluoroalkoxyfluorocarbon polymer, and a polyvinylidene fluoride polymer resin. The walls of the polymer container are usually between about 5 and 100 mils thick, preferably between about 5 and 50 mils thick, and more preferably between about 5 and 25 mils. In some specific applications, the walls of the polymer container are between about 8–12 mils thick.

In another aspect, the invention relates to a method for long-term protection of a wooden structure from decay comprising:

inserting a fumigant in a sealed container into said wooden structure, said container having walls comprising a fiber-free, heat-sealable organic polymer ampule, which is a single layer tube sealed at both ends that is permeable to but otherwise inert to the fumigant, said walls allowing the fumigant to be retained while permitting controlled release of a sufficient amount of said fumigant to diffuse at a rate of fumigant loss of between about 1 and 15 mg/day through the walls to protect the wooden structure from decay for a period of time of between about 2 to 30 years or up to at least 7 years or for up to about 30 years, with the proviso that no external force, other than ambient pressure and temperature, is present to release said fumigant from the sealed container.

In another aspect, the present invention concerns a wooden structure treated by a process, which process comprises:

inserting a fumigant in, at least one sealed container into said wooden structure, the container having walls comprising a fiber-free, heat-sealable organic polymer ampule, which is a single or multiple layer tube sealed at both ends that is permeable to but otherwise inert to said fumigant, the walls having a thickness sufficient to retain the fumigant while permitting controlled release of a sufficient amount of the fumigant to diffuse at a rate of fumigant loss of between about 1 and 15 mg/day through the walls to protect said wooden structure from decay for a period of time of up to at least 1 year or for up to about 30 years, with the proviso that no external force other than ambient pressure and temperature is present to release the fumigant from the sealed container.

Preferably, the wooden structure is protected using a polymer selected from the group consisting of a high density polyethylene polymer, a polypropylene polymer, a crosslinked polyethylene polymer, a crosslinked polypropylene polymer, a surface fluorinated high-density polyethylene polymer, a fluoroalkoxyfluorocarbon polymer, and a polyvinylidene fluoride polymer resin; and the fumigant is selected from the group consisting of chloropicrin, methyl isothiocyanate, and sodium N-methyl-dithiocarbamate.

Preferably the polymer is selected from the group consisting of fluorocarbons, and (surface fluorinated) polyolefins.

Preferably the polymer is a surface fluorine modified high density polyethylene polymer having a wall thickness of between about 8 to 12 mils;
the fumigant is chloropicrin; and the time of release is up to about 7 years.

In a preferred aspect, the fumigant is selected from the group consisting of chloropicrin, methyl isothiocyanate and sodium N-methyl-dithiocarbamate;

the polymer of the container is selected from the group consisting of a surface fluorinated high-density polyethylene polymer, a fluoro-alkoxyfluorocarbon polymer, and a polyvinylidine fluoride resin; and
the prolonged time is up to at least about 1 year or up to about 7 years or up to about 30 years.

In a specific aspect, the present invention relates to a method for long-term protection of a wooden structure from decay comprising:

inserting a fumigant in a sealed container into the wooden structure, the container having walls of an organic polymer ampule, which is a fiber free, heat sealable single layer tube which is sealed at both ends, that is permeable to but otherwise inert to the fumigant, the walls allowing the fumigant to be retained while permitting controlled release of a sufficient amount of the fumigant to diffuse at a rate of fumigant loss of between 1 and 15 mg/day through the walls to protect the wooden structure from decay for a prolonged period of time, which prolonged time is obtained by selection of a polymer container and a weight of fumigant, with the proviso that no external force, other than ambient pressure and temperature, is present to release said fumigant from the container.

BRIEF DESCRIPTION OF THE DRAWINGS

FIG. 1 is a schematic cross-sectional representation of an ampule made according to the present invention.

FIG. 2 is a schematic cross-sectional representation of a fumigant-filled ampule inserted into a wooden structure.

FIG. 3 is a schematic cross-sectional representation of a fumigant-filled ampule of the present invention wherein the ampule is blow molded and has a rounded bottom.

DETAILED DESCRIPTION OF THE INVENTION

Definitions

As used herein:

"Ampule" refers to the permeable container from which the fumigant is slowly released. The polymers are described herein. The ampule may be a polymer vessel, a preformed polymer bottle with a sealed opening, a polymer tube in which one or both ends are sealed. Some embodiments use a polymer vessel which is fluorinated to slow the rate of permeation of the fumigant. The ampule may be a single layer or multiple layers, or a laminate, or a composite. However, there are no conventional "openings" in sealed ampule. The ampule does not have an opening which is sealed with a material which degrades within a certain time to create an opening from which the fumigant evaporates. Preferably, the filled sealed ampule is placed in the cavity of the wooden structure and is not subjected to any additional external pressure other than ambient pressure and temperature. "Fumigant" refers to all fumigants which are useful to permeate through unwoven fused polymer, preferred fumigants are described herein below. More preferably, the fumigant is independently selected from chloropicrin, methyl isothiocyanate or sodium N-methyl-dithiocarbamate. Most preferably, the fumigant is chloropicrin. "Polymer" refers to the specific polymers described herein below. Preferably, the polymer is a continuous sheet polymer, that is not woven prior to fusing. Preferably the polymer is a single layer, non-woven, fiber free and heat sealable film or tube.

"Prolonged period" refers to time that the container will release the fumigant by permeation through the container walls. The times are usually for periods of months or years, such as any time per month between about 1 month to 360 months, between about 1 to 30 years, between about 1 to 20 years, between about 1 to 15 years, between about 2 to 10 years, between about 1 to 7 years, between about 2 to 7 years and the like. One of skill in the art with the information provided herein can select the polymer, its thickness and the fumigant (and amount of fumigant) to be effective for a predetermined time period.

The present invention relates to an ampule or container that can be inserted internal to a wooden structure to controllably release a fumigant into the wooden structure and protect the structure from decay for a prolonged period of time, preferably up to about 30 years. The ampule or container of the present invention is made of a polymer that is permeable to but otherwise inert to the fumigant.

The rate of release of fumigant from the ampule is in part dependent upon the physical structure of the ampule. For example, the rate of fumigant release increases as the surface area exposed to the fumigant in increased. Conversely, the quantity of fumigant released per unit time decreases as the thickness of the polymer wall exposed to the fumigant is increased. The degree of efficiency, economy, and safety of the ampule increases with the length of time that the ampule controllably releases the fumigant.

The selection of the proper combination of polymer, fumigant, and solvent (if present) is important to successful use of the invention. A suitable polymer should be permeable to the fumigant but otherwise inert to the fumigants. Preferred polymers are fluorinated high-density polyethylene, fluoroalkoxyfluorocarbons, and polyvinylidene fluoride. Other suitable polymers include thermoplastic materials or chemically modified thermoplastic materials, such as low density or high density polyethylene that has been irradiated (e.g., using an electron beam) to become a thermoset polymer. Suitable thermoplastic materials include: polyolefins (such as high density polyethylene or polypropylene); polyamides; polyesters; fluorinated polyolefins; fluoroalkoxyfluorocarbons; fluorine-treated polyolefins; fluoro-polymers such as polyvinylidene fluoride (PVDF); fluorinated ethylene/propylene copolymers; modified (thermoset) polyethylenes; and fluorocarbon resins (all substitutable elements are fluorine or fluorine/chlorine), including, e.g., polyvinylidene fluoride, ethylenetetrafluoroethylene copolymer, ethylenechlorotrifluoroethylene copolymer, polytetrafluoroethylene, copolymers of tetrafluoroethylene and hexafluoropropylene, copolymers of tetrafluoroethylene and perfluoroalkoxyvinylether, and polychloro trifluoroethylene. This list of polymers is not all-inclusive.

Where a polyolefin or other hydrocarbon is used, or where commercially available bottles are purchased, e.g., bottles made of high density polyethylene, it generally will be desirable to have the containers fluorinated to decrease the permeability of the container. Such a procedure also is known as "barrier enhancement." Fluorination or "barrier enhancement" can be performed by any commercial fluorination specialist, such as ExFluor, of Houston, Tex.

Suitable fumigants for wood treatment are known in the art. A preferred fumigant is chloropicrin (trichloronitromethane), available from Great Lakes Chemical as Chlor-O-Pic, EPA Reg. No. 5785-17, 96.5% A.I. Other preferred fumigants include methyl isothiocyanate and sodium N-methyl-dithiocarbamate. Other suitable fumigants include, but are not limited to: cis-N-[1,1,2,2, tetrachloroethyl)thio]-4-cyclohexene-1,2-dicarboximide, aluminum phosphide, carbon disulfide, carbon tetrachloride, 1,3-dichloropropene and mixtures of 1,3-dichloropropene and 1,2-dichloropropene, dichloroethyl ether, ethylene dibromide, ethylene dichloride, hydrocyanic acid, orthodichlorobenzene, acrylonitrile, 3-chloro-2-methylpropene, trichloroethylene, 1,1,1-trichloroethane, monochloroacetonitrile, trichloroacetonitrile, 1,2-dichloropropane, 1,2-epoxypropane, 1,1-dichloro-1-nitroethane, 1,2-dibromo-3-chloropropane, 1-bromo-2-chloroethane, 3-bromo-1-chloropropene, 3-bromo-1-chloropropyne, 1-chloro-2,3-epoxypropane, 1,2-dichloroethane, tetrachloroethylene, and combinations thereof. This list is not intended to be all-inclusive.

Many different solvents may be used to prepare solutions containing the foregoing chemicals as long as the solvent does not interfere with the release of the fumigant into the wood and the solvent is inert to and does not deactivate the fumigant. The fumigant agent may be used in pure, undiluted form, or diluted with solvent at a concentration that is less than or equal to the solubility of the fumigant in the particular solvent or solvent mixture. The fumigant agent should be effective at concentrations well below the concentration at its limit of solubility in the solvent.

The ampule should permit controlled release of the fumigant at a dose sufficient to protect the wood for a desired period of time. Currently, the ampules contain 26.6 gms of chloropicrin, with a deviance of ±2%. Although the dosage of fumigant required to effectively treat a wood structure will vary with the molecular weight, efficacy, and rate of release of the fumigant, a total dose of about 75 gms should be sufficient to prevent decay of a 14" pole for most fumigants. For purposes of safety and efficiency, the total dose preferably is achieved using multiple ampules, preferably between 3–5 ampules. If multiple ampules are used, sustained release may be achieved even if one of the ampules breaks or is otherwise damaged. Ampules 6" in length×⅝" diameter made of the following materials and containing about 26.5 gms of chloropicrin have been found to have the following loss rates:

TEFLON™ PFA 350—0.215 mg/day

KYNAR™ 740=0.056 mg/day

High molecular weight high density polyethylene, fluorinated=12.3 mg/day

High density polyethylene, fluorinated=20.6 mg/day

A fluorinated NALGENE™ bottle, (NALGENE™ is a trademark of the Nalgene Corporation of Chicago, Ill. for a polyethylene container), 2.5" long×⅝" diameter, had a rate loss of 1.8 mg/day.

A preferred embodiment uses ampules made of polymers having a fumigant loss rate of about 1–15 mg/day, such as PVDF, TEFLON™ PFA 350, or KYNAR™ 740 (trademarks of the DuPont Company of Wilmington, Del. for fluorinated polymers). In this preferred embodiment, the walls of the ampule should have a thickness between about 8–12 mil, preferably a thickness of about 10 mil, and the outer diameter of the ampule should be less than one inch, preferably about 0.625 inches. The length of the ampule preferably should be about 6 inches. The fumigant used in this preferred embodiment is chloropicrin, and each ampule contains at least about 25 gms, preferably 26.5 gms of chloropicrin. These ampules are inserted in three different bores. The bores should be far enough apart to retain the structural integrity of the pole, but as close together as possible, preferably about 1 foot apart vertically and about 3" apart horizontally.

The ampule 10 may be a commercially available container, such as a NALGENE™ bottle, or may be manufactured using any suitable procedure, a preferred procedure being commercially available extrusion techniques. Referring to FIG. 1, the ampule 10 consists of a tubular wall 12 which is sealed at each end 16 and 18 to form an enclosed containment area 14. To manufacture the ampule 10, polymeric raw materials which are available from many commercial suppliers should be extruded into tubing having a desired diameter and wall thickness. The tubing should be cut to an appropriate size dependent upon the fumigant to be used, the amount of fumigant and the rate of release of the fumigant 15. For the materials and fumigants listed above, an appropriate length is about six-inches.

One end of the ampule should be heat sealed, preferably using a thermal impulse sealer. For the listed materials, sealing at a temperature of about 350° F. for about 1–30 seconds should create a suitable seal. Ampules sealed at one end should be filled with fumigant, preferably by placing the ampules in a tube holder and filling them with a sufficient amount of fumigant to fill the ampule using a commercial liquid-filling machine. If liquid chloropicrin is used in the 6-inch container described above, a preferable amount of chloropicrin would be about 26.6 grams of "neat" Chlor-O-Pic, EPA Reg. No. 5785-17, Great Lakes Chemical, West Lafayette, Ind. A polyvinylidene fluoride ampule with the foregoing dimensions containing 26.6 grams of chloropicrin should weigh approximately 30 gms.

After filling the ampule with fumigant, the open end of the ampule should be sealed, preferably using a thermal impulse sealer. The filling and sealing process preferably should be conducted in a hood, and the personnel involved in the filling and sealing process should wear appropriate gloves, apron, respirator and face shield as a precaution. After completing the filling and sealing process, and after confirming that the ampules have the correct weights and are properly sealed, each ampule should be placed in a MYLAR™-lined pouch (a trademark of the DuPont Corporation, Wilmington, Del. for polymeric ethyleneterephthalate) and the pouch is sealed.

A large heavy-walled bottle made of NALGENE™ can serve as a shipping container for the ampule/pouched product.

To insert the ampule into a wood structure, a bore should be formed in the wood structure using an appropriate drill or similar device. Referring to FIG. 2, the bore 20 should have an inner diameter that is slightly larger than the outer diameter 22 of the ampule 10. The bore 20 may be at, above, or below the ground line 24. Preferably, the bore 20 should be at an angle 26 to the surface of the wood 28 to help gravity retain the ampule 10 and to maintain contact between the walls 12 of the ampule 10 and the walls (23 and 23A) of the bore 20 as the fumigant, is depleted. Angle 26 is between about 30 and 60°, preferably about 45°. A preferred diameter 30 for the bore 20 is about ⅞inch. A preferred depth 32 for the bore is about 8 inches. The bore 20 should be longer than the ampule 10 to permit the placement of a plug 34 after the ampule 10 is inserted.

After the bore 20 has been drilled, the ampule 10 should be removed from its shipping bottle and pouch and inserted into the bore 20. A plug 34, preferably wooden, should be inserted into the bore 20 to form a seal at the surface of the wood 28. Field inspections should be conducted every seven to nine years to visually detect any fungi invasion. A hammer or blunt instrument may be used to test the integrity of the wood structure.

In one embodiment, ampule 30 is shown in cross-section in FIG. 3. It is blow molded as described in Example 4(a). The tubular walls 31 and 31A and bottom area 32 are about the same thickness, as is the top shoulder areas 33 and 33A. After blow molding wherein the thickness of the active surface is between about 5 and 100 mils, preferably between about 5 and 50 mils, more preferably between about 8 and 40 mils, and most preferably between about 10 and 40 mils, the fumigant 34, e.g., chloropicrin, e.g., 34 g is added.

The neck 35 of the molded ampule is then sealed, e.g., heat-sealed as in Example 1. The ampule is then ready to be inserted into a wooden structure for controlled release of the fumigant 34.

The invention is better understood with reference to the following examples. These examples are presented for the purpose of description and illustration only.

They are not to be considered to be limiting in any way.

EXAMPLE 1

Polyvinylidine Fluoride with Chloropicrin

Polyvinylidene fluoride tubing (KYNAR™) having an outer diameter of 0.625 inches and a wall thickness of approximately 10 mils is purchased from Atochem North America, Inc., Philadelphia, Pa. The tubing is cut to six-inch lengths and one end is sealed using an automatic thermal impulse sealer at about 350° F. for 6 seconds. The weight of each 6-inch ampule (empty) is approximately 3.5 grams. The ampules, now sealed at one end, are placed in a tube holder and a commercial liquid-filling machine is used to fill the ampules with 26.6 grams of "neat" Chlor-O-Pic, EPA Reg. No. 5785-17, Great Lakes Chemical, West Lafayette, Ind. The other end of the filled ampules are sealed, again using an automatic thermal impulse sealer at about 350° F. for 10 seconds. The chloropicrin is not directly exposed to heat.

The ampule is placed in a pouch lined with MYLAR™ in a NALGENE™ bottle and transported to the treatment site. A ⅞inch diameter, 8-inch depth bore is drilled at a 45° angle into a wood pole. The ampule is removed from the Nalgene bottle and pouch and placed in the bore hole. The bore hole then is sealed with a wood plug. The ampule will protect the wood structure from decay for at least seven years and up to about 30 years.

EXAMPLE 2

Fluorinated High Density Polyethylene Bottle with Chloropicrin

High density polyethylene bottles having 50 mils walls, an outer diameter of approximately ⅝", and a volume capacity of 5 ml are purchased from commercial sources, e.g., NALGENE™. The bottles are subjected to batch fluorination by a commercial fluorination specialist. Using a commercial filling machine, 6.64 grams of liquid chloropicrin are added to each bottle. The bottle caps are screwed onto the bottles, and the bottles are stored in vermiculite.

Bore holes having a diameter of 1 inch and a depth of 8 inches are drilled into a wood pole. In order to provide the same dosage as provided by the ampule in Example 1, four of the bottles are inserted end to end into each bore hole. The ampule will protect the wood structure from decay for at least seven years and up to about 30 years.

EXAMPLE 3

High Density Polyethylene Ampule with Chloropicrin

High density polyethylene tubing having an outer diameter of 0.625 inches and a wall thickness of approximately 10 mils is purchased from Quantum Chem. Corp. of USI, 11500 Northlake Drive of Cincinnati, Ohio 45249. The tubing is cut to six-inch lengths and one end is sealed using an automatic thermal impulse sealer at about 350° F. for 6 seconds. The weight of each 6-inch ampule (empty) is approximately 3.5 grams. The ampules, now sealed at one end, are placed in a tube holder and a commercial liquid-filling machine is used to fill the ampules with 26.6 grams of "neat" Chlor-O-Pic, EPA Reg. No. 5785-17, Great Lakes Chemical, West Lafayette, Ind. The other end of the filled ampules are sealed, again using an automatic thermal impulse sealer at about 350° F. for 10 seconds. The chloropicrin is not directly exposed to heat.

The ampule is placed in a pouch lined with MYLAR™ in a NALGENE™ bottle and transported to the treatment site. A ⅞inch diameter, 8-inch depth bore is drilled at a 45° angle into a wood pole. The ampule is removed from the Nalgene bottle and pouch and placed in the bore hole. The bore hold then is sealed with a wood plug. The ampule will protect the wood structure from decay for at least one year or 7 years and up to about 30 years.

EXAMPLE 4

High Density Polyethylene Ampule with Chloropicrin (a) High density polyethylene (LB560200) from Quantum Chem. Corp. of Cincinnati, Ohio is blow molded in a conventional molder by R&D Molders, 3716 Dime Circle, Austin, Tex. 78744 (under contract). See FIG. 3. The polyethylene ampule was then subjected to a level 3 fluorination treatment on the exterior surface.

The ampule is about 6 inches long and about 0.625 inch in diameter. The wall thickness is 40 mil. Chloropicrin (34 g) is added to the ampule. The ampule is then sealed as described in Example 3 using a thermal ampule sealer at about 350° F. for 10 sec, and is ready to be used as described in Ex. 3.

A similar long term release of chloropicrin is observed.

(b) Example 4(a) is repeated except that 25 g of chloropicrin is sealed in the ampule and the wall thickness of the ampule is 12 mil.

(c) Example 4(a) is repeated except that 46 g of chloropicrin is sealed in the ampule and the wall thickness of the ampule is 80 mil.

A person of skill in the art will recognize that many modifications may be made to the present invention using polymers to achieve controlled release of a fumigant to protect a wooden structure without departing from the spirit and scope of the present invention. The embodiment described herein is meant to be illustrative only and should not be taken as limiting the invention, which is defined in the following claims.

What is claimed is:

1. A wooden structure which is protected from decay for a prolonged period of time by controlled, prolonged treatment with a fumigant, said structure comprising:
   a wooden structure; and
   a fumigant which is contained within at least one sealed container inserted into said wooden structure,
   wherein said fumigant is selected from the group consisting of
      chloropicrin, methyl isothiocyanate, sodium N-methyl-dithiocarbamate, cis-(N-(1,1,2,2-tetrachloroethyl)thio)-4-cyclohexene-1,2-dicarboximide, aluminum phosphide, and combinations thereof, said container having walls comprising a fiber free heat sealable organic polymer ampule, wherein said organic polymer is selected from the group consisting of polypropylene, crosslinked polypropylene, crosslinked polyethylene, high density polyethylene, low density polyethylene, high density polypropylene, polyvinylidene fluoride, surface fluorinated high density polyethylene and combinations thereof, which container is a single or multiple layer tube sealed at both ends by heat which polymer is permeable to but otherwise inert to said fumigant, said walls allowing said fumigant to be retained for a period of time of at least one year or for increasing periods of one year up to about 30 years while permitting controlled release of a sufficient amount of said fumigant to diffuse at a rate of fumigant loss of between about 1 and 15 mg/day through said walls to protect said wooden structure from decay for a period of time of at least 1 year or for increasing periods of one year up to about 30 years, with the proviso that no external force other than ambient pressure and temperature is present to release said fumigant from said sealed container, with the proviso that said ampule does not have an opening which is sealed with a material which degrades within a certain time to create the opening from which the fumigant leaves the ampule.

2. The wooden structure of claim 1, wherein said container has a wall thickness of about 5 to 100 mil.

3. The wooden structure of claim 1, wherein said polymer is independently selected from the group consisting of high density polyethylene, polypropylene, crosslinked polyethylene, crosslinked polypropylene, a surface fluorinated high-density polyethylene polymer and a polyvinylidene fluoride polymer resin.

4. The wooden structure of claim 3, wherein said walls of the container are about 5 to 100 mils thick.

5. The wooden structure of claim 4, wherein said container has an outer diameter of less than about one inch and a length of about 6 inches.

6. The wooden structure of claim 1, wherein said fumigant is independently selected from the group consisting of chloropicrin, methyl isothiocyanate, and sodium N-methyl-dithiocarbamate.

7. The wooden structure of claim 2, wherein said fumigant is independently selected from the group consisting of chloropicrin, methyl isothiocyanate, and sodium N-methyl-dithiocarbamate.

8. The wooden structure of claim 3, wherein said fumigant is independently selected from the group consisting of chloropicrin, methyl isothiocyanate, and sodium N-methyl-dithiocarbamate.

9. The wooden structure of claim 4, wherein said fumigant is independently selected from the group consisting of chloropicrin, methyl isothiocyanate, and sodium N-methyl-dithiocarbamate.

10. The wooden structure of claim 5, wherein said fumigant is independently selected from the group consisting of chloropicrin, methyl isothiocyanate, and sodium N-methyl-dithiocarbamate.

11. The wooden structure of claim 4, wherein said fumigant is chloropicrin.

12. A method for long-term protection of a wooden structure from decay which method comprises:
   inserting a fumigant into the structure
   wherein said fumigant is selected from the group consisting of chloropicrin, methyl isothiocyanate, sodium N-methyl-dithiocarbamate, cis-(N-(1,1,2,2-tetrachloroethyl)thio)-4-cyclohexene-1,2-dicarboximide, and combinations thereof, which fumigant is contained within a sealed container into said wooden structure, said container having walls comprising a fiber-free, heat-sealable organic polymer ampule, wherein said organic polymer is selected from the group consisting of polypropylene, crosslinked polypropylene, crosslinked polyethylene, high density polyethylene, low density polyethylene; high density polypropylene, polyvinylidene fluoride, surface fluorinated low density polyethylene and combinations thereof, which container is a single layer tube heat sealed at both ends that is permeable to but otherwise inert to said fumigant, said walls allowing said fumigant to be retained for a period of time of at least one year up to about 30 years, while permitting controlled release of a sufficient amount of said fumigant to diffuse at a rate of fumigant loss of between about 1 and 15 mg/day through said walls to protect said wooden structure from decay for a period of time of at least one year and for up to about 30 years, with the proviso that no external force, other than ambient pressure and temperature, is present to release said fumigant from said sealed container; and allowing the fumigant to diffuse over time to protect the wooden structure, with the proviso that said ampule does not have an opening which is sealed for a short time with a material which degrades within a time to create the opening from which the fumigant leaves the ampule.

13. The method of claim 12, wherein said container has a wall thickness of about 5 and 100 mils.

14. The method of claim 12, wherein said polymer is independently selected from the group consisting of a high density polyethylene polymer, a polypropylene polymer, a crosslinked polyethylene, a crosslinked polypropylene, a surface fluorinated high-density polyethylene polymer and a polyvinylidene fluoride polymer resin.

15. The method of claim 12, wherein said fumigant is independently selected from the group consisting of chloropicrin, methyl isothiocyanate, and sodium N-methyl-dithiocarbamate.

16. The method of claim 13, wherein said fumigant is independently selected from the group consisting of chloropicrin, methyl isothiocyanate, and sodium N-methyl-dithiocarbamate.

17. The method of claim 14, wherein said fumigant is independently selected from the group consisting of chloropicrin, methyl isothiocyanate, and sodium N-methyl-dithiocarbamate.

18. The method of claim 14, wherein said ampule is high density polyethylene and said fumigant is chloropicrin.

19. A method for long-term protection of a wooden structure from decay which method comprises:
(a) inserting a fumigant wherein said fumigant is selected from the group consisting of chloropicrin, methyl isothiocyanate, sodium N-methyl-dithiocarbamate, cis-(N-(1,1,2,2-tetrachloroethyl)thio)-4-cyclohexene-1,2-dicarboximide, and combinations thereof, within in a sealed container into said wooden structure, said container having walls of an organic polymer ampule, wherein said organic polymer is selected from the group consisting of high density polyethylene, low density polyethylene, high density polypropylene, polyvinylidene fluoride, surface fluorinated high density polyethylene and combinations thereof, which is a fiber free, heat sealable single layer polymer tube which is heat sealed at both ends, that is permeable to but otherwise inert to said fumigant, said walls allowing said fumigant to be retained for a prolonged period while permitting controlled release of a sufficient amount of said fumigant to diffuse at a rate of fumigant loss of between 1 and 15 mg/day through said polymer walls to protect said wooden structure from decay for a prolonged period of time, which prolonged time of about 1 year to about 30 years is obtained by selection of a polymer container, the thickness of the walls and the weight of fumigant, with the proviso that no external force, other than ambient pressure and temperature, is present to release said fumigant from said container, with the proviso that said ampule does not have an opening which is sealed with a material which degrades within a certain time to create the opening from which the fumigant leaves the ampule; and allowing said fumigant to diffuse over time to protect the wooden structure.

20. The method of claim 19 wherein:
the fumigant is independently selected from the group consisting of chloropicrin, methyl isothiocyanate and sodium N-methyl-dithiocarbamate;
the polymer of the container is independently selected from the group consisting of a surface fluorinated high-density polyethylene polymer and a polyvinylidine fluoride resin; and
the prolonged time is between about 2 and 15 years.

21. The method of claim 19 wherein:
the fumigant is independently selected from the group consisting of chloropicrin, methyl isothiocyanate and sodium N-methyl-dithiocarbamate;
the polymer of the container is independently selected from the group consisting of a high density polyethylene, a surface fluorinated high-density polyethylene polymer, and a polyvinylidine fluoride resin; and
the prolonged time is between about 1 and 30 years.

22. The method of claim 19 wherein:
the fumigant is chloropicrin;
the polymer is high density polyethylene or surface fluorinated high density polyethylene having a thickness of between about 5 and 100 mil; and
the prolonged period is between about 2 and 30 years.

23. The method of claim 22 wherein:
the polymer is surface fluorinated high density polyethylene having a thickness of about 40 mil.

24. The wooden structure of claim 1 wherein:
the fumigant is chloropicrin;
the polymer is high density polyethylene, or surface fluorinated high density polyethylene having a thickness of between 5 and 100 mil and the prolonged period is between about 2 and 30 years.

25. The wooden structure of claim 1 wherein in the ampule:
the polymer is surface fluorinated high density polyethylene having a thickness of about 40 mils.

26. A wooden structure which is protected from decay for a prolonged period of time by controlled, prolonged treatment with a fumigant, said structure comprising:
a wooden structure; and
a volatile fumigant which is contained within at least one sealed container inserted into said wooden structure, said container having walls comprising a fiber free heat sealable organic polymer ampule, which container is a single or multiple layer tube sealed at both ends by heat which polymer is permeable to but otherwise inert to said fumigant, said walls allowing said fumigant to be retained for a period of time of at least one year or for about one year to about 30 years while permitting controlled release of a sufficient amount of said fumigant to diffuse at a rate of fumigant loss of between about 1 and 15 mg/day through said walls to protect said wooden structure from decay for a period of time of at least 1 year or for about one year to about 30 years, with the proviso that no external force other than ambient pressure and temperature is present to release said fumigant from said sealed container, with the proviso that said ampule does not have an opening which is sealed with a material which degrades within a time to create the opening from which the fumigant leaves the ampule, wherein said polymer is independently selected from the group consisting of a high density polyethylene polymer, high density polypropylene, cross linked polyethylene, cross linked polypropylene, a surface fluorinated high-density polyethylene polymer, and a polyvinylidene fluoride polymer;

wherein said fumigant is independently selected from the group consisting of chloropicrin, methyl isothiocyanate, and sodium N-methyl-dithiocarbamate.

27. The wooden structure of claim 26, wherein said fumigant is chloropicrin.

28. The wooden structure of claim 26, wherein said fumigant isomethyl isothiocyanate.

29. The wooden structure of claim 26, wherein said fumigant is sodium N-methyl-dithiocarbamate.

30. The wooden structure of claim 26, wherein said polymer is independently selected from the group consisting of a high density polyethylene and a surface fluorinated high-density polyethylene polymer.

31. The wooden structure of claim 30, wherein said fumigant is chloropicrin.

32. The wooden structure of claim 30, wherein said fumigant is methyl isothiocyanate.

33. The wooden structure of claim 30, wherein said fumigant is sodium N-methyl-dithiocarbamate.

* * * * *